(12) United States Patent
Caetano Pereria et al.

(10) Patent No.: US 8,436,725 B2
(45) Date of Patent: May 7, 2013

(54) TRACKING SYSTEM WITH REDUNDANT SECURITY AND RETRANSMISSION FEATURES

(75) Inventors: Abilio Caetano Pereria, Espartinas (ES); Francisca García Rivera, Espartinas (ES)

(73) Assignee: Vision Sistemas de Localizacion, S.L., Espartinas (Sevilla) (ES)

( * ) Notice: Subject to any disclaimer, the term of this patent is extended or adjusted under 35 U.S.C. 154(b) by 1413 days.

(21) Appl. No.: 11/994,596

(22) PCT Filed: Aug. 10, 2006

(86) PCT No.: PCT/ES2006/070129
§ 371 (c)(1),
(2), (4) Date: Jan. 3, 2008

(87) PCT Pub. No.: WO2007/020317
PCT Pub. Date: Feb. 22, 2007

(65) Prior Publication Data
US 2010/0134280 A1   Jun. 3, 2010

(30) Foreign Application Priority Data
Aug. 19, 2005   (ES) .................................. 200502072

(51) Int. Cl.
*G08B 29/00*   (2006.01)
(52) U.S. Cl.
USPC ...................................... 340/508; 340/539.13

(58) Field of Classification Search .................. 340/508, 340/539.13, 539.2, 989
See application file for complete search history.

(56) References Cited

U.S. PATENT DOCUMENTS

| | | | |
|---|---|---|---|
| 2001/0048364 A1* | 12/2001 | Kalthoff et al. | ............ 340/573.1 |
| 2005/0001720 A1* | 1/2005 | Mason et al. | ............ 340/539.13 |

FOREIGN PATENT DOCUMENTS

| | | |
|---|---|---|
| WO | 02/095438 | 11/2002 |
| WO | 03/085414 | 10/2003 |
| WO | 03/107708 | 12/2003 |

* cited by examiner

*Primary Examiner* — Shirley Lu
(74) *Attorney, Agent, or Firm* — Dickinson Wright PLLC (57) ABSTRACT

System which is constituted by one or more positioning devices (2), one or more localizers (1), one or several communication networks and one or several control centers (3). The localizers (1) and the positioning devices (2) have two or more communication interfaces and two or more positioning systems. The positioning devices (2) can calculate the position through some of the positioning systems and send their position via one of the communication interfaces, avoiding inoperability if one of the positioning systems or one of the communication interfaces fails to work. The localizers can perform the function of nodes (4) and forward the data of the position of a positioning devices and make them reach the localizer which has requested that information. Both the positioning devices and the localizers are mobile units. The control centers can monitor the position of the positioning devices if necessary.

14 Claims, 5 Drawing Sheets

FIG.9 ical signal which is detected and interpreted by a receiving unit. The receiver will indicate the direction or the position in which the transmitting unit is situated.
TRACKING SYSTEM WITH REDUNDANT SECURITY AND RETRANSMISSION FEATURES

OBJECT OF THE INVENTION

The present invention relates to a tracking system with redundant security and retransmission features, which has been specially conceived for remote tracking and tracing of people, animals or objects.

The object of the invention is to provide a rugged tracking system which is not made inoperative through problems in the communication interface (inoperability), problems in the positioning system (inoperability) or access problems (inaccessibility) between the positioning devices and the localiser.

BACKGROUND OF THE INVENTION

The radiolocation technique is known for the location of people, animals or objects. In it, a transmitting unit periodically emits a radiofrequency signal which is detected and interpreted by a receiving unit. The receiver will indicate the direction or the position in which the transmitting unit is situated.

Diverse radiotracking systems are known, which are characterized in the use of a transmitter which has a positioning system (such as the UPS system) and which transmit a radiofrequency signal with that information through one and only one communications network or system. That information is stored in a data centre, which can be consulted by a terminal with access to the centre. Access to the centre is commonly carried out through Internet or through a customer support telephone service. The form of transmitting the data of the position is through mobile telephony networks.

Radiotracking systems are also known in which the transmitter has a positioning system (commonly GPS) and transmits the information of its position through a modulated radiofrequency signal which reaches the receiver in a direct way, which either is not mobile or needs to be connected to a computer to display the position of the originator in a graphic form.

Radiotracking systems are known in which the originator waits to be polled by the receiver in order to transmit the information of its position. Radiotracking systems are also known in which the transmitter transmits its position to the receiver in the event of alert or emergency.

The problem which this type of device presents is that they only incorporate one communication interface to forward the information of the position of the transmitter to the receiver, as well as the use of a single positioning system, which in many cases can cause inoperability due to a problem in the communication interface or a problem in the positioning system, or inaccessibility because the positioning devices and/or the localiser are out of coverage, in any of these cases location would not be possible.

DESCRIPTION OF THE INVENTION

The tracking system with redundant security and retransmission features which the invention proposes resolves the problem outlined above in a fully satisfactory manner, using two or more communication interfaces and using the retransmission features functionality, to deliver the information of the position of the transmitter (positioning devices) to the receiver (localiser) and vice versa, and using two or more positioning systems, avoiding the possible problems of inoperability and/or inaccessibility.

In more specific terms, the system that is disclosed is constituted by a positioning devices, one or more localisers, several wireless communication systems or networks and one or more control centres.

Both the localiser and the positioning devices have two or more communication interfaces. Also, both have two or more positioning systems.

The communication interfaces can be GSM, DCS, PCS, CDMA, UMTS, TETRA, Bluetooth, 802.11 in any one of their variants or versions thereof, Wimax, and similar.

The different positioning systems can be GPS (Global Positioning System), GLONASS, GALILEO, GSM, or similar.

A localiser will be able to communicate with one or more positioning devices simultaneously. Likewise, a positioning devices will be able to communicate with one or more localisers simultaneously.

The localiser will be able to communicate with the positioning devices in diverse ways using one of its access interfaces to the medium. They will be able to communicate:

In a direct manner, via a radio-link between the localiser and the positioning devices, or through one or several multi-purpose network infrastructures (entry gateways being possible which carry out the protocol conversions between the network infrastructures). Also called single-hop communication.

Indirectly, through a location network infrastructure or through a network of dynamic/changing topology formed by node localisers which forward/route the messages creating a path between the localiser and the positioning devices and vice versa. Also called multiple hop or multi-hop communication.

In a deferred mode using an intermediate station which monitors, stores and forwards the messages.

A hybrid communication is also possible in which two or more forms are used of those described above.

Habitually, the localiser will send a polling message to the positioning devices through a communication interface to find the position of the positioning devices.

The positioning devices will receive the polling message through a communication interface. After interpreting the message, it will respond with another message which contains the requested information and it will be sent through a communication interface. If the requested information is the position, the positioning devices will obtain it from one of the positioning systems.

The positioning devices and the localiser can exchange messages using one, two or more communication interfaces.

If the positioning devices is not directly accessible for the localiser, the localiser, using the same communication interface, can request a second node localiser which performs the functions of intermediate node, which second node localiser can in turn request a third node localiser to perform the functions of intermediate node, and so forth until reaching a node localiser that has accessibility to the positioning devices. If this happens, an indirect route will have been set up between the localiser and the positioning devices. The polling message sent by the localiser will be forwarded by the node localisers involved (indirect route) to the positioning devices, which will respond to the message sent with another message which will follow the same route in the reverse direction until reaching the localiser. The route set up for the communication (exchange of messages) between the localiser and the positioning devices is chosen dynamically in terms of the position of the localiser, positioning devices and node localisers and the accessibility between them, being based on an optimised routing algorithm (reactive or proactive) for this type of network, which is not an object of the present invention.

It is said that two units (positioning devices, positioning devices, node positioning devices) have accessibility between them if messages can be sent directly. A route is understood to be the path that a message follows from the source to the destination. With this functionality, inaccessibility is avoided in the tracking system.

In accordance with another of the characteristics of the invention, if the positioning devices does not have direct accessibility (single hop) with the localiser and nor can it find an indirect route (several hops) to access the positioning devices using the same communication interface, the positioning devices will abandon the communication interface used and will change to using another communication interface. With this functionality, inaccessibility is avoided in the tracking system.

If the localiser or the positioning devices detect that the communication interface which they are using is inoperative, they will switch to another communication interface that is operative in order to communicate. With this functionality, inoperability is avoided in the tracking system.

The inoperability status in the communication will be detected when the localiser or the positioning devices are unable to transmit the desired message through the communication interface in use.

The selection of the communication interface will be governed by a system of priorities. These priorities can be fixed for any instant, or be dependent upon environmental parameters.

The localiser and the positioning devices can use different communication interfaces if between them there is a gateway which carries out the pertinent conversion of protocol, frequency or modulation.

If the localiser or the positioning devices detects that the communication interface which they are using is inoperative, they will switch to another positioning system which is operative in order to receive its position. With this functionality, inoperability is avoided in the tracking system.

The states of inoperability in the positioning will be detected when the localiser or the positioning devices are unable to receive their position with the positioning system in use.

The selection of the positioning system will be governed by a system of priorities. These priorities can be fixed for any event, or dependent upon environmental parameters.

DESCRIPTION OF THE DRAWINGS

To supplement the description that is being made and with the object of assisting in a better understanding of the characteristics of the invention, in accordance with a preferred example of practical embodiment thereof, this description is accompanied, as an integral part thereof, with a set of drawings wherein, by way of illustration and not restrictively, the following has been represented.

PREFERRED EMBODIMENT OF THE INVENTION

In view of the figures mentioned, it can be observed how the tracking system which is disclosed is constituted fundamentally by at least a localiser (1) and a positioning devices (2) which can communicate through two or more wireless communication interfaces and one or more control centres (3) and be positioned using two or more positioning systems.

As already mentioned, the localiser (1) will be able to communicate with the positioning devices (2) in diverse ways using one of its communication interfaces.

Figure 1:
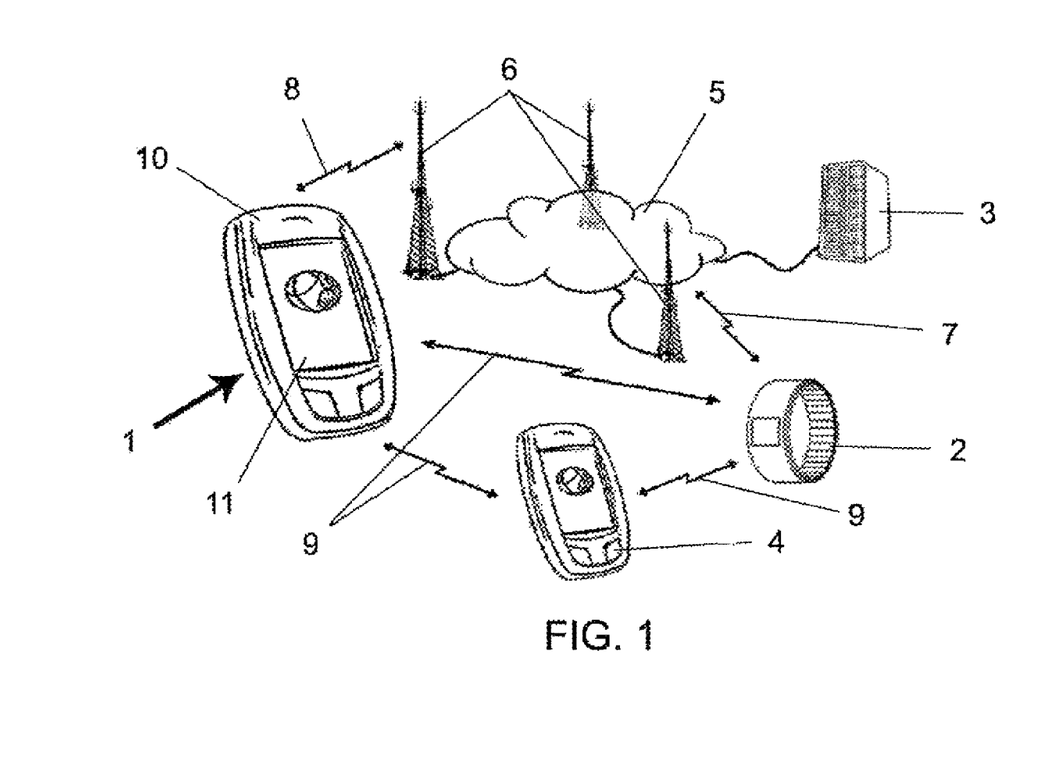
FIG. 1.—It shows a schematic representation of the architecture of a tracking system with redundant security and retransmission features, implemented in accordance with the object of the present invention.

As one can observe in FIG. 1, in which in addition to the localiser (1), the positioning devices (2) and the control centre (3), a node localiser (4), a GSM multi-purpose network infrastructure (5) with multiple BTS access points (6) participate in the tracking system. The localiser (1) and the positioning devices (2) both have two communication interfaces, a GSM communication interface and a TETRA communication interface.

The localiser (1) and the positioning devices (2) have both two positioning systems, a GPS positioning system and a GSM positioning system (service offered by the GSM operator).

Likewise, the localiser (1) and the positioning devices (2) both have a subscriber number to the GSM network, both knowing the two numbers.

The localiser (1) and the positioning devices (2) both have a TETRA number, both knowing the two numbers.

The data centre (3) is connected to the GSM multi-purpose network infrastructure (of one of the multiple forms possible).

With this configuration, the localiser (1) can know the position or another detail of the positioning devices (2) in several ways:

In a direct way through the GSM network (5):

The localiser (1) will poll the positioning devices (2) sending a coded message to the subscriber number of the positioning devices (2), (making use of a GSM radio-link (7) between the localiser (1) and a BTS access point (6). The GSM network (5) will deliver the message to the positioning devices (2) (making use of a GSM radio-link (7), a BTS access point and the positioning devices (2). The positioning devices (2) will decode the message, prepare the requested information, code it in a text message and send said text message to the GSM subscriber number of the localiser (1) through the GSM network (5) (making use of a GSM radio-link (7), a BTS access point (6) and the positioning devices (2)). The GSM network (5) will deliver the text message to the localiser (1) (making use of a GSM radio-link (8) between the localiser (1) and a BTS access point (6). The localiser will decode the text message received and will obtain the position of the positioning devices (2).

In a direct way via a TETRA radio-link (9):

The localiser (1) will poll the positioning devices (2) sending a coded message to the TETRA number of the positioning devices (2), via a TETRA radio-link (9). The positioning devices (2) will receive the message, decode it, prepare the requested information, code and encapsulate it in a message and send said message to the TETRA address of the localiser (1) via a TETRA radio-link (9). The localiser will decode the text message received and will obtain the position of the positioning devices (2).

In an indirect way through a node localiser (4):

The localiser (1) will poll the positioning devices (2) sending a coded message (which contains a routing tag) to the TETRA address of the node localiser (4), via a TETRA radio-link (9). The node localiser (4) will process the routing tag. The node localiser will send the message received to the TETRA address of the positioning devices (2), via a TETRA radio-link (9). The positioning devices (2) will receive the message, decode it, prepare the requested information, code and encapsulate it in a message and send said message (which contains a routing tag) to the TETRA address of the node localiser (4) via a TETRA radio-link (9). The node localiser (4) will process the routing tag and send the message received to the TETRA address of the localiser (1), via a TETRA radio-link (9). The localiser will decode the text message received and will obtain the position of the positioning devices (2).

In a deferred way through the GSM network (5) and passing through the control centre (3).

The localiser (1) will be connected to Internet through GPRS (making use of a GSM radio-link (8) between the localiser (1) and a BTS access point (6)) and access the web server of the control centre (3), where it can query the historical record of the positions of the positioning devices (2) (if this service was requested previously) or other data of interest.

If the localiser (1) only wishes to obtain the position of the positioning devices, it can use a shortcut method to carry out the polling, which consists in calling the number (GSM or TETRA) of the positioning devices instead of sending a message. The positioning devices (2) will reject the incoming call, prepare the information on its position and encapsulate it in a message. Starting from here the system will work in the same manner as previously explained.

The positioning devices (2) may have its position up-to-date, and can respond to an enquiry immediately, or on the other hand, if it does not have its position up-to-date, the positioning devices will have to obtain its position through one of its two positioning systems.

The positioning devices (2) will obtain its position through the GPS system, activating the GPS receiver (10). If after a certain time the GPS receiver (10) does not respond with the position, the positioning devices will abandon this positioning system and switch to the GSM positioning system, at this time the positioning devices will request the service from the GSM operator, commonly sending an SMS message to a specific number, after which, the GSM operator will send an SMS message to the positioning devices (2) indicating its position (the characteristics for use of this service are particular to each operator).

The selection order of one positioning system or another is governed by fixed or variable priorities depending on the environment. In a simplified manner orders of priority can be established that minimize battery consumption, minimize the economic cost and minimize the response time.

By default, the positioning devices (2) will only obtain its position in the event of receiving a polling.

The localiser (1) will communicate with the positioning devices (2) in one of the possible ways, basing its selection on some fixed or variable priorities depending on the environment. In a simplified manner orders of priority can be established that minimize battery consumption, minimize the economic cost and minimize the response time.

The positioning devices (2) will send the requested information to the localiser (1) if, and only if, the permits register of the positioning devices (2) includes the localiser (1) as having permission for reading that information.

Once the localiser (1) knows the position of the positioning devices (2), it will show the position of the positioning devices (2) on a map on the display (11), and optionally and if the scale of the map so allows, it will also show its own position.

The localiser (1) will obtain its position in the same way as the positioning devices (2) does.

The positioning devices (2) can send a warning message with its position to the localiser (1) or to the data centre (3) depending on the status of sensors or depending on its position.

The positioning devices (2) can have a geo-referenced perimeter configured which it cannot surpass. In this case, the positioning devices (2) will update its position periodically, and if it detects that it is outside of the configured perimeter, it will send a warning message with its position to the localiser (1) or to the data centre (depending on how it is configured). It will act in the same way if it has to poll sensors periodically, which must report a value of between a configured minimum and a maximum.

Figure 2:
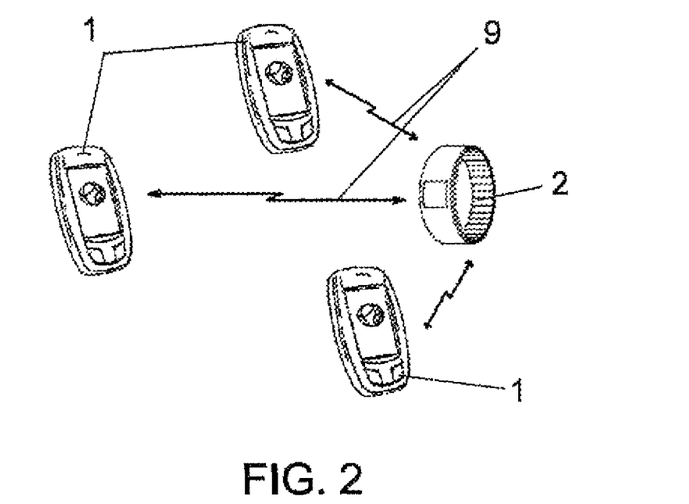
FIG. 2.—It shows a schematic representation of a tracking system wherein several localisers and a positioning devices intervene, communicating in a direct manner.

As can be observed in FIG. 2, it has also been foreseen that the tracking system can comprise several localisers (1) and a positioning devices (2).

The positioning devices (2) has the three localisers (1) in its register with access permission. The three localisers (1) are interested in knowing the position of the positioning devices (2).

The localisers (1) and the positioning devices (2) communicate in a direct way through a TETRA radio-link (9).

If the time between requests from the localisers (1) is less than a pre-established value, the positioning devices (2) will send an answer message by broadcasting (message going to all). The message will have to be encrypted.

Figure 3:
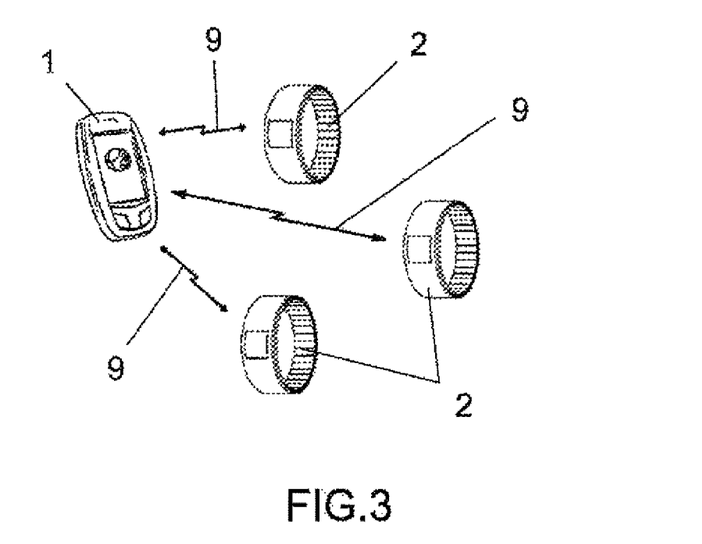
FIG. 3.—It shows a schematic representation of a tracking system wherein one localiser and several positioning devices intervene, communicating in a direct manner.

Likewise, as can be observed in FIG. 3, the system can incorporate one localiser (1) and several positioning devices (2).

The positioning devices (2) have the localiser (1) in their register with access permission.

The localiser (1) is interested in knowing the position of the three positioning devices (2). The localiser (I) will be able to request information from one of the positioning devices (2) sending a message through a radio-link (9) with that positioning devices (2) in a direct manner. If the localiser (1) wants to know the position of the three positioning devices (2), it will send a broadcast message. If the message includes the polled TETRA numbers, only the positioning devices (2) affected will respond. If the message does not include the polled TETRA numbers, all the positioning devices will respond that have the localiser (1) in their register with access permission.

Figure 4:
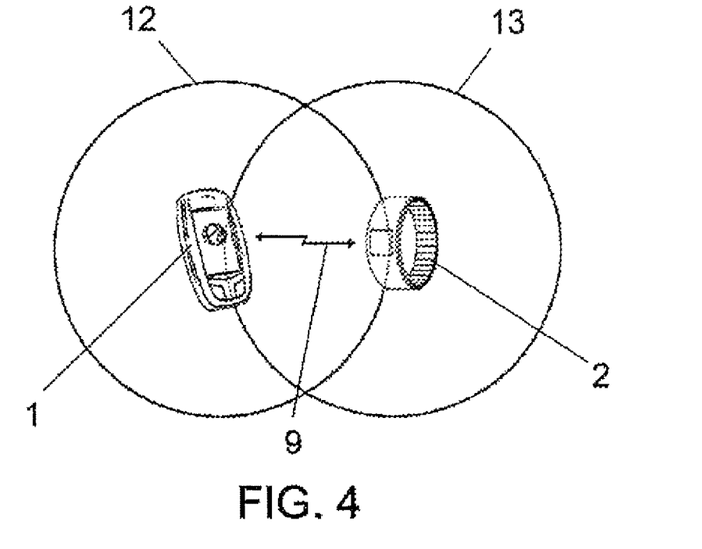
FIG. 4.—It shows an example of communication of the system in a direct manner between a localiser and a positioning devices, the localiser being inside the coverage radius of the positioning devices and vice versa.

In FIG. 4 an example of communication is shown between a localiser (1) and a positioning devices (2) in a direct manner through a TETRA radio-link (9), wherein the TETRA coverage radius (12) of the localiser (1) and the TETRA coverage radius (13) of the positioning devices (2) are shown explicitly. For the communication to take place in a direct way, it is necessary that the positioning devices (2) be inside the coverage radius (12) of the localiser (1) and that the localiser (1) be inside the coverage radius (13) of the positioning devices (2).

Figure 5:
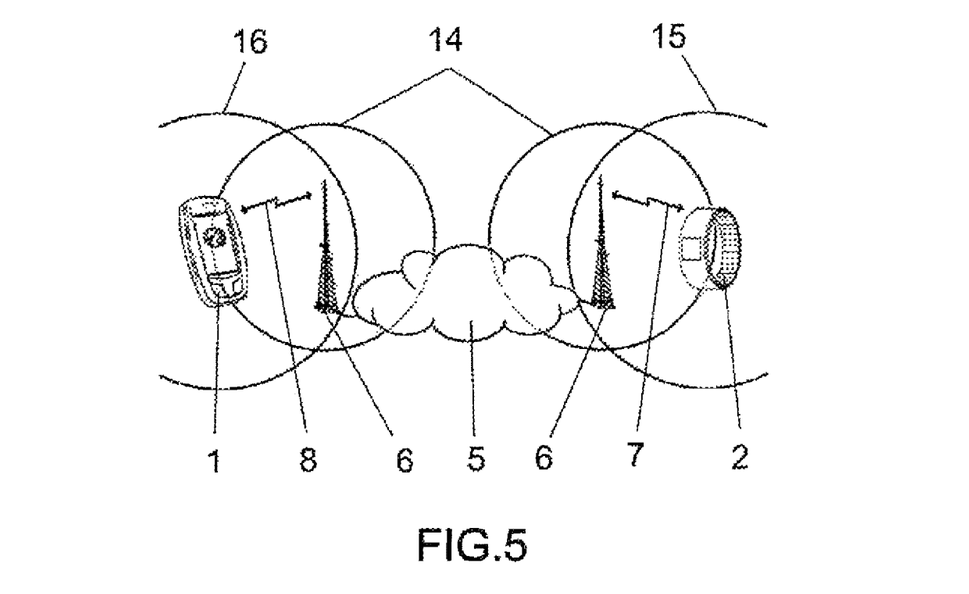
FIG. 5.—It shows an example of communication of the system in a direct manner between a localiser and a positioning devices, through a multi-purpose network infrastructure, the localiser and the positioning devices being inside the coverage radius of the multi-purpose network infrastructure and vice versa.

In FIG. 5 an example of communication is shown between a localiser (1) and a positioning devices (2) in a direct manner through a GSM network infrastructure (5). In order that the communication can take place in a direct way it is necessary that the positioning devices (2) be inside the GSM coverage radius (14) of a GSM BTS (6), that said GSM BTS (6) be inside the GSM coverage radius (15) of the positioning devices (2), that the localiser (1) be inside the GSM coverage radius (14) of a GSM BTS (6) and that said GSM BTS (6) be inside the GSM coverage radius (16) of the localiser (1).

Figure 6:
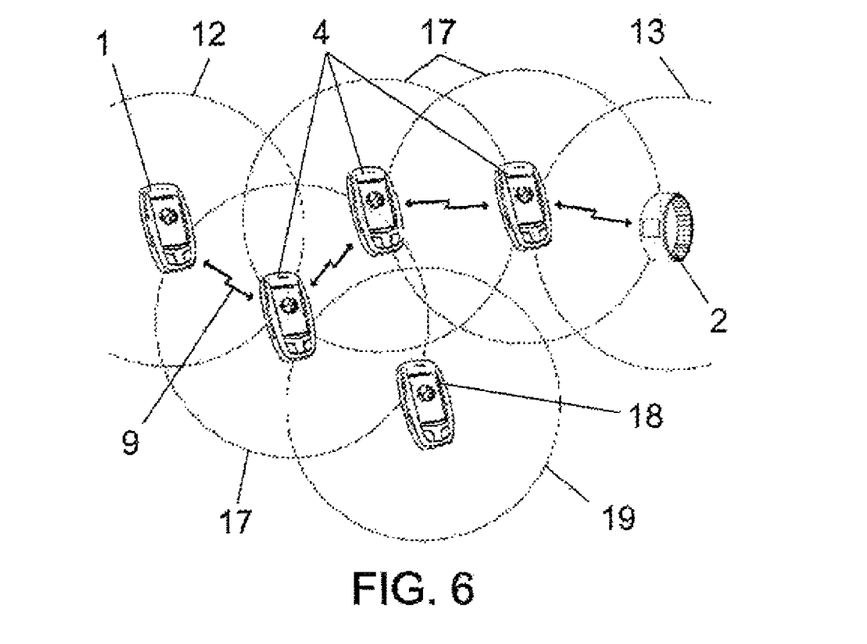
FIG. 6.—It shows an example of communication of the system in an indirect manner between a localiser and a positioning devices.

In FIG. 6 an example of communication is shown between a localiser (1) and a positioning devices (2) in an indirect manner through one or more node localisers (4). In order that the communication can take place in an indirect way, it is necessary that the positioning devices (2) be inside the TETRA coverage radius (17) of a node localiser (4), that said localiser (4) be inside the TETRA coverage radius (13) of the positioning devices (2), that the localiser (1) be inside the TETRA coverage radius (17) of a node localiser (4), that said localiser (4) be inside the TETRA coverage radius (12) of the localiser (1) and that the intermediate node localisers (4) through which the communication path is set up have their TETRA coverage radii (17) overlapping consecutively.

There can also be node localisers (18) not implicated in the communications route, either because they do not belong to the optimum route, or because their TETRA coverage radius (19) does not overlap with two or more node localisers (4).

Figure 7:
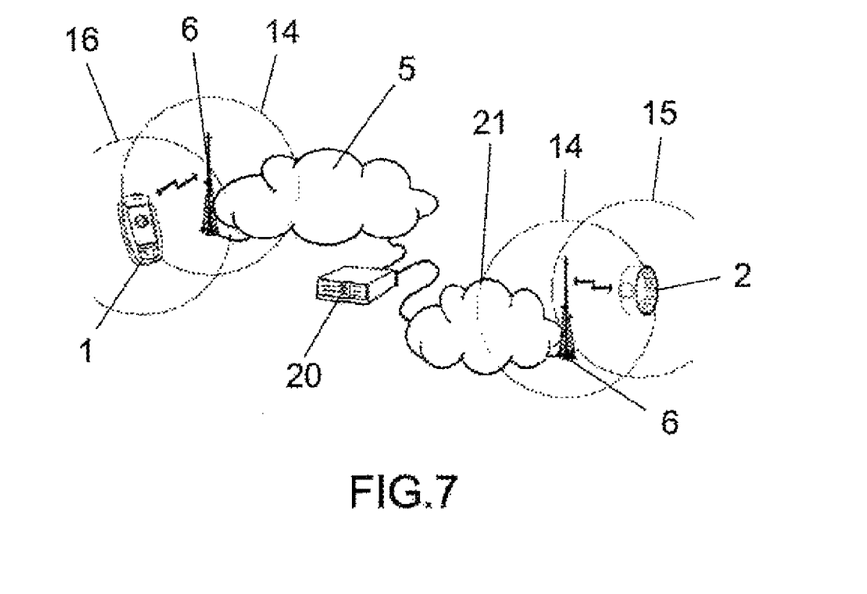
FIG. 7.—It shows an example of communication of the system in a direct manner between a localiser and a positioning devices, wherein a localiser, a positioning devices, two multi-purpose network infrastructures and an access gateway intervene.

In FIG. 7 an example of communication is shown between a localiser (1) and a positioning devices (2) in a direct way each using a different communication interface and through a GSM network infrastructure (5), a gateway (20) and a TETRA network infrastructure (21).

Figure 8:
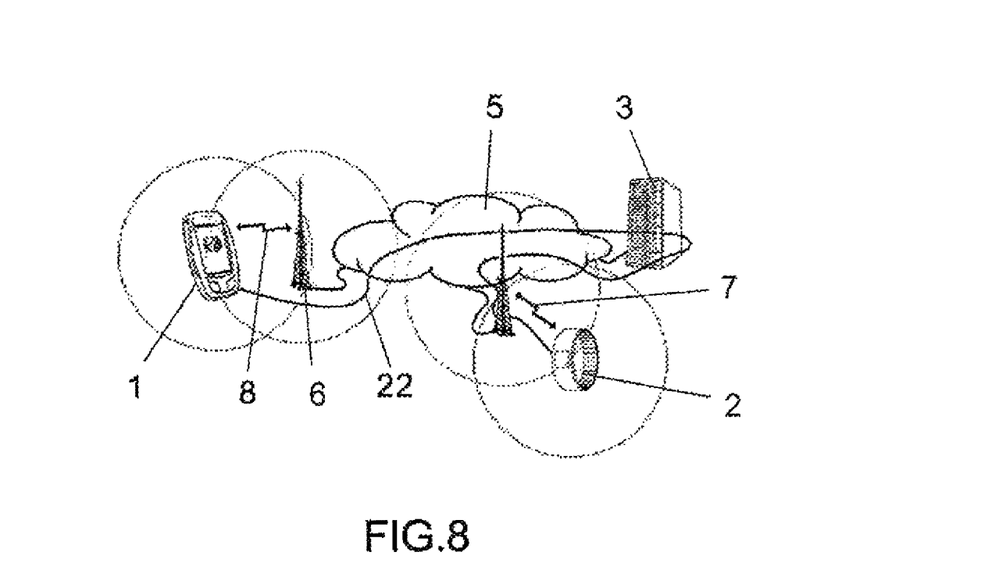
FIG. 8.—It shows an example of communication of the system between a localiser and a positioning devices, wherein a localiser and a positioning devices communicating in a deferred manner, a multi-purpose network infrastructure and a data centre intervene.

In FIG. 8 an example of communication is shown between a localiser (1) and a positioning devices (2) in a deferred manner through a GSM network infrastructure (5), and a data centre (3). The localiser (1) will obtain the position of the positioning devices (2) in the following manner: The localiser (1) will be connected to Internet (by GPRS or with a data call) through the GSM network (5), using a GSM radio-link (8) with a GSM BTS (6). Once connected to Internet, the localiser (1) will access the web service of the data centre (3) and will request the desired information on the positioning devices (2). If the localiser has access permission to that information, the web server of the data centre (3) will deliver the requested information. If the data centre (3) is requested for information of the positioning devices (2) that is not up-to-date, the data centre (3) will have to poll the positioning devices (2) by sending it a message through the GSM network (5). The GSM network (5) will deliver the message to the positioning devices (2), the positioning devices (2) will decode the message, prepare the requested information, code it in a text message and send said text message to the GSM subscriber number of the data centre (3) through the GSM network (5) (making use of a GSM radio-link (7), a BTS access point (6) and the positioning devices (2)). The GSM network (5) will deliver the text message to the data centre (3) and the latter will reveal the information to the localiser (1) through the web service.

The data centre can poll the positioning devices (2) in any one of the forms that the localiser (1) can employ or respond to the localiser (1) in any one of the forms that the positioning devices (2) can employ, which forms have been explained above.

The data centre (3) can have a web interface accessible through Internet and wherein a user can carry out any of the actions that he can carry out with a localiser (1), provided the user has access permission to the positioning devices (2).

The communication route (22) indicates the route that the data follow.

Figure 9:
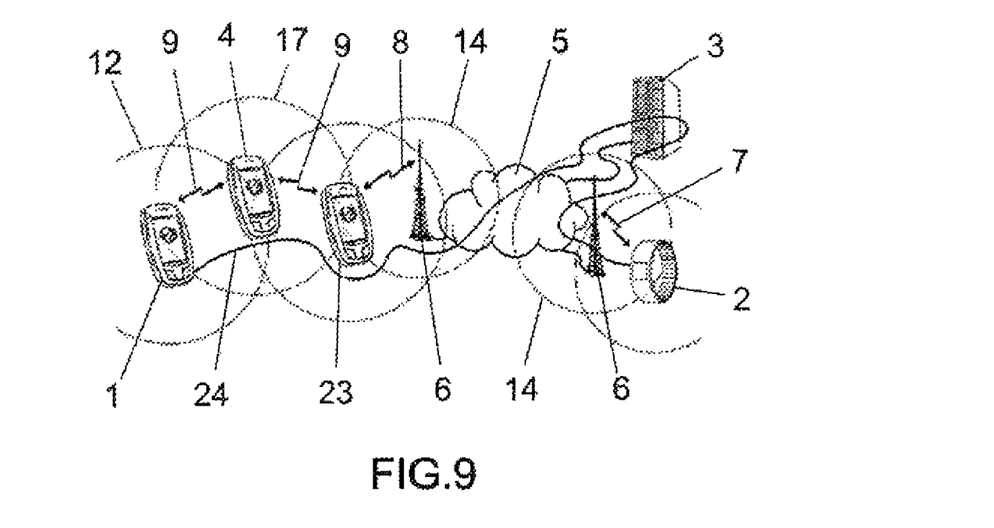
FIG. 9.—It shows an example of communication of the system between a localiser and a positioning devices, communicating in a hybrid manner, wherein two node localisers, a multi-purpose network infrastructures and a data centre also intervene.

In FIG. 9 an example of communication is shown between a localiser (1) and a positioning devices (2) in a hybrid manner, using two different communication interfaces through a node localiser (4), a node localiser working in gateway mode (23), a GSM network infrastructure (5), and a data centre (3).

The localiser (1) will obtain the position of the positioning devices (2) in the following manner:

The localiser (1) has the GSM communication interface inoperative because there is no BTS (6) inside its GSM coverage radius. The localiser (1) will switch to the TETRA communication interface and send a message to the TETRA number of the positioning devices. The positioning devices (2) is not inside the TETRA coverage radius (12) of the localiser (1), therefore the communication will not be set up and the localiser (1) will not obtain an answer. The localiser (1) will then look for a route to reach the positioning devices. Once the localiser (1) finds the best route (24) to access the positioning devices (2), it sends a message (with a routing tag) to the node localiser (4) through a TETRA radio-link (9), the latter forwards that message to the node localiser in gateway mode (23) through a TETRA radio-link (9), the node localiser (23) encapsulates the message received in an SMS message and retransmits it to the GSM network (5) directed to the GSM subscriber number of the positioning devices (2). The GSM network (5) will deliver the message to the positioning devices (2), the positioning devices (2) will decode the message, prepare the requested information, code it in a text message together with the route tag and send said text message to the GSM subscriber number of the node localiser (23) through the GSM network (5) (making use of a GSM radio-link (8), a BTS access point (6) and the positioning devices (2)). The GSM network (5) will deliver the text message to the node localiser (23). This last element will decode the message, code it into a TETRA message and send it to the node localiser (4) through a TETRA radio-link (9), which, on receiving the message, will forward it to the localiser (1) through a TETRA radio-link (9), the localiser will decode the message and obtain the requested information.

The invention claimed is:

1. A tracking system which comprises:
   at least one positioning device (2);
   at least one localizer (1);
   the at least one positioning device employs a plurality of different positioning systems and in case the at least one positioning device detects that the positioning system which is being used is inoperative, it will switch to another positioning system that is operative;

the at least one localizer is a mobile unit;

the at least one positioning device including a plurality of different communication interfaces;

the at least one localizer including a plurality of different communication interfaces;

the at least one localizer and the at least one positioning device configured to communicate between each other either in a direct form through a radio-link or one or more multi-purpose network infrastructures, and in an indirect form through a network of dynamic or changing topology formed by node localizers, and in a hybrid form using one or more forms of communication, among direct, indirect and deferred mode wherein this deferred mode uses an intermediate centre (3) which monitors, stores and forwards the messages;

wherein if the at least one localizer or the at least one positioning device detects that the communication interface which is being used is inoperative, it will switch to another communication interface that is operative in order to establish communication;

wherein the selection of the communication interface is governed by a system of priorities which depend on environmental parameters;

the at least one localizer and the at least one positioning device incorporating functions for establishing themselves as network nodes (4);

the at least one positioning device configured to communicate with several localizers simultaneously; and the at least one localizer device configured to communicate with several positioning devices simultaneously.

2. The tracking system with redundant security and retransmission features, according to claim 1, characterized in that the at least one localizer includes two or more different positioning systems.

3. The tracking, according to claim 1, characterized in that the at least one localizer and the at least one positioning communicate between each other in a deferred form using an intermediate centre (3) which monitors, stores and forwards the messages.

4. The tracking system, according to claim 2, characterized in that the data centre (3) monitors the position of the at least one positioning device and is accessible for the at least one localizer or other device with access permission.

5. The tracking system, according to claim 4, characterized in having a data centre which holds geo-referenced maps that can be downloaded by the at least one localizer if required.

6. The tracking system, according to claim 1, characterized in that the at least one localizer (1) and the at least one positioning device (2) communicate with each other in the hybrid form using one or more forms of communication, among direct, indirect and deferred.

7. The tracking system, according to claim 1, characterized in that the communication interfaces can be GSM, DCS, PCS, CDMA, UMTS, TETRA, Bluetooth, 802.11 in any one of the variants or versions thereof, and Wimax.

8. The tracking system, according to claim 1, characterized in that the system of priorities is fixed at all times.

9. The tracking system, according to claim 1, characterized in that the at least one localizer and the at least one positioning device use different communication interfaces, a gateway existing between them which performs the pertinent conversion of protocol, frequency or modulation.

10. The tracking system, according to claim 1, characterized in that the different positioning systems can be GPS (Global Positioning System.

11. The tracking system, according to claim 1, characterized in that if the at least one localizer or the at least one positioning device detect that the positioning system which is being used is inoperative, it will switch to another positioning system that is operative.

12. The tracking system, according to claim 1, characterized in that the at least one localizer (1) is mobile, and incorporates a display screen or monitor (11) whereon are shown in graphic terms the position of the at least one positioning device (2) and its own position.

13. The tracking system, according to claim 1, characterized in that it incorporates a system of coding messages which uses encryption.

14. The tracking system, according to claim 3, characterized in having a data centre (3) with a web interface accessible through Internet and where a user can carry out any of the actions that he can carry out with the at least one localizer (1), provided the user has access permission for the at least one positioning device (2).

\* \* \* \* \*